United States Patent [19]

Frissora

[11] 4,291,575
[45] Sep. 29, 1981

[54] LIQUID LEVEL MONITOR

[75] Inventor: Anthony P. Frissora, Mendham, N.J.

[73] Assignee: Allied Chemical Corporation, Morris Township, Morris County, N.J.

[21] Appl. No.: 52,367

[22] Filed: Jun. 27, 1979

[51] Int. Cl.³ ............................................. G01F 23/14
[52] U.S. Cl. ........................................ 73/302; 222/64
[58] Field of Search ................. 73/302, 290 R, 299; 222/64; 137/386, 403

[56] References Cited

U.S. PATENT DOCUMENTS

| | | | |
|---|---|---|---|
| 2,455,200 | 11/1948 | Wallace | 73/299 |
| 3,200,971 | 8/1965 | Trethewey | 73/302 X |
| 3,373,609 | 3/1968 | Sundby | 73/299 |
| 3,499,580 | 3/1970 | Smith | 73/302 X |
| 3,964,535 | 6/1976 | Bedell et al. | 164/66 |
| 4,020,690 | 5/1977 | Samuels et al. | 73/299 |
| 4,142,571 | 3/1979 | Narasimhan | 164/88 |

Primary Examiner—Gerald Goldberg
Assistant Examiner—Joseph W. Roskos
Attorney, Agent, or Firm—Ernest D. Buff; Gerhard H. Fuchs

[57] ABSTRACT

Apparatus is provided for monitoring the level of a liquid in a reservoir, especially in the situation where the liquid is a high temperature, molten material. The device operates as a static-tube differential pressure sensor and includes an open-ended tube with one end adapted for direct immersion in the liquid and with the other end being in pneumatic communication with a conventional differential pressure transducer. The meniscus of the liquid entering the tube essentially acts as a diaphragm membrane and eliminates the need for an immersible diaphragm, as conventionally used with static-tubes. The device may actuate a controller for compensating any change in the liquid level from a reference.

12 Claims, 4 Drawing Figures

LIQUID LEVEL MONITOR

BACKGROUND OF THE INVENTION

This invention relates generally to the monitoring of a liquid level within a reservoir and specifically to such monitoring utilizing a type of static-tube level sensor and more specifically to such monitoring wherein the liquid is a molten alloy.

Extruding a molten alloy from a pressurized crucible through an extrusion nozzle onto a rotating chill surface is one of several technologically significant methods available for the continuous casting of continuous glassy alloy filaments, as representatively shown in U.S. Pat. No. 4,142,571 "Continuous Casting Method for Metallic Strips" issued Mar. 6, 1979 to M. Narasimhan.

The degree of transverse dimensional constancy along the length of the filament is sensitive to variations in the stream of extruded melt impinging upon the rotating chill surface and therefore sensitive to extrusion pressure at the extrusion nozzle. Nozzle pressure is determined by the total effect of the static head of the molten alloy above the nozzle and the gas over-pressure within the pressurized crucible. Thus, to maintain a substantially constant nozzle pressure during extrusion, either a compensating molten alloy flow to the crucible must be provided or the pressurization of the crucible must be increased accordingly. In either situation, it is fundamental to monitor the level of the molten alloy in the crucible.

It is known to use pressure-tube devices to sense a liquid level. These devices are attractive for such use owing primarily to their simplicity. However, substantial materials problems are frequently encountered in applying these devices for sensing the level of a high temperature, molten material. There are basically two types of pressure-tube level sensors: the static-tube in combination with an immersible diaphragm, wherein the differential pressure between the static head in the liquid and the tube pressure causes deflection of the diaphragm membrane which is correlated with liquid level; and the bubbler-tube, wherein one opening of the tube is placed in the liquid and a flow of gas is passed through the tube with the resulting back-pressure being correlated to the liquid level. The static-tube with diaphragm device is not suitable for immersion in a molten material as the high temperature environment likely will cause destruction of the diaphragm or, at the least, contamination of the melt. The bubbler-tube may be unsatisfactory where the bubbling action interferes with the particular metallurgical process, especially in a small scale, sensitive process, for example by gas bubbles being entrained in the extruded flow of the above described filament casting process.

The present invention overcomes these limitations by utilizing only a static-tube whereby the meniscus of the liquid in the static-tube essentially acts as a diaphragm.

SUMMARY OF THE INVENTION

The apparatus of the invention provides for the monitoring of the level of a liquid in a reservoir, especially a high temperature molten material, including:

(a) a differential pressure transducer;

(b) a tube having a first open end adapted for direct immersion in the liquid and a second end in pneumatic communication with the transducer; and (c) means for adjusting a reference quantity of gas within the tube after immersion of its first end in the liquid, the quantity of gas corresponding to a selected reference tube pressure further corresponding to a selected monitoring sensitivity.

The apparatus may advantageously include control means for compensating a change in the level of the liquid in response to the output of the transducer. The control means may actuate a compensating inert gas flow to pressurize the reservoir such that the total head at a reference elevation in the liquid is maintained within a selected range, while the liquid is being withdrawn from the reservoir. Further, for continuous operation, the control means may actuate a compensating liquid flow to the reservoir such that the level is maintained within a selected range.

The method of the invention utilizes apparatus that includes an open-ended tube having one end in pneumatic communication with a differential pressure transducer and comprises:

(a) immersing the open end of the tube in the liquid; then (b) adjusting a reference quantity of inert gas within the tube after immersion of its open end; and then (c) determining the level of the liquid by comparing the output of the transducer with a reference value, as its output varies with variations in the liquid level.

Preferably, step (b) further comprises selecting the reference quantity of gas as corresponding to a selected reference tube pressure further corresponding to a selected sensitivity in monitoring the liquid level.

The method may advantageously include compensating for changes in the level from a reference value in response to the output of the transducer. The compensating step may further include maintaining the total head at a reference elevation in the liquid within a selected range, while the liquid is being withdrawn from the reservoir, by providing a compensating inert gas flow to pressurize the reservoir in response to the output of the transducer. Further, for continuous operation, the compensating step may include maintaining the level within a selected range by providing a compensating liquid flow to the reservoir in response to the reservoir gas pressure.

BRIEF DESCRIPTION OF THE DRAWINGS

Further details are given below with reference to the embodiments shown in the drawings wherein.

DESCRIPTION OF THE PREFERRED EMBODIMENTS

Figure 1:
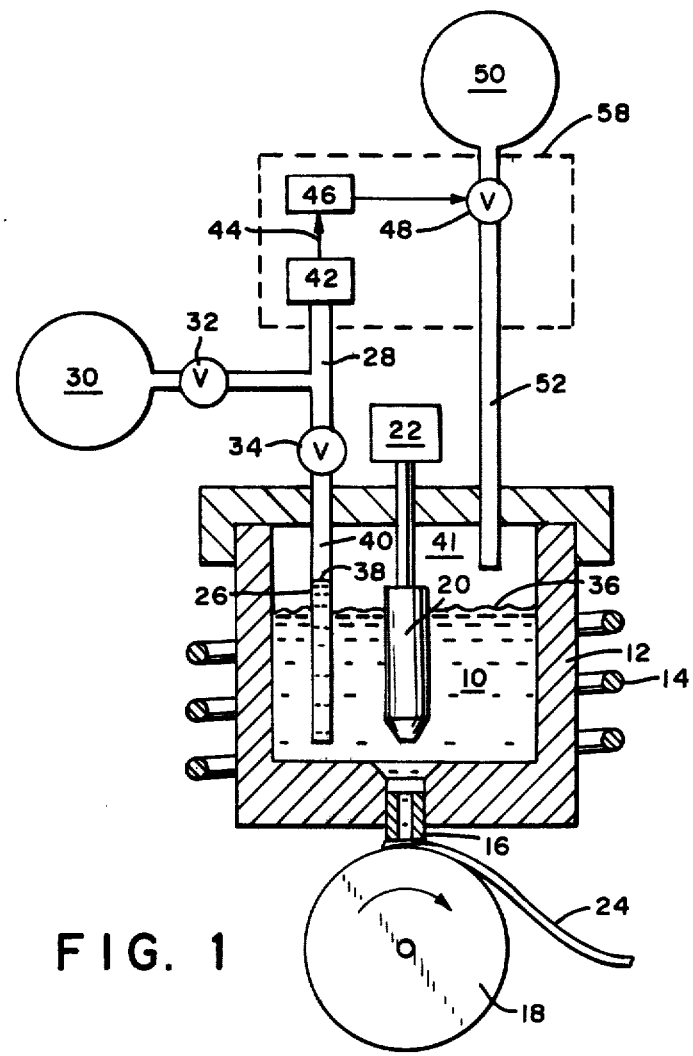
FIG. 1 shows schematically the present invention as applied to maintain a substantially constant extrusion pressure in typical apparatus for the continuous casting of glassy alloy filaments.

Referring more particularly to the drawings, in FIG. 1 apparatus of the present invention for the monitoring of a liquid level is adapted to typical apparatus for the continuous casting of glassy alloy filaments. Molten alloy 10 is extruded from a pressurized crucible 12, provided with a heating element 14, through an extrusion nozzle 16 onto a rotating chill surface 18. A stopper rod 20 and an associated drive mechanism 22 provides for the opening and closing of the extrusion nozzle 16. The solidifed, moving filament 24, after its break-away point from the chill roll 18, is typically routed through a tension regulator and finally onto a winder (not shown). This apparatus is representatively shown in U.S. Pat. No. 3,964,535 "Stopper Rod Tapping Assembly and Filament Forming Process" issued June 22, 1976, to J. Bedell and R. Smith, and is hereby incorporated by reference.

The present invention provides a static-tube 26 for direct immersion in the molten alloy 10. The tube 26 is provided with an intermediately positioned tap 28, facilitating pressurization of the tube to a reference pressure from an inert gas source 30 through a shut-off valve 32. Further, an isolation valve 34 on the static-tube is provided. The variation of the liquid level 36 in the crucible causes corresponding variation in the liquid level 38 within the static-tube 26, which in turn causes corresponding pressure variation of the tube gas 40. These pressure fluctuations are sensed and compared to a reference pressure by a conventional differential pressure transducer 42, which produces an output signal 44 corresponding to a change in the crucible level 36 from a reference value. The differential pressure signal 44 is transmitted to a conventional controller 46, such as a microcomputer controller, which in turn actuates a servo-valve 48 that provides a compensating fluid flow from a fluid source 50 to the crucible via an input conduit 52.

The compensating fluid may be either a gas or a liquid depending on the operational mode of the overall casting process, the control object being the extrusion pressure at the nozzle. If the process is operated in the batch or semi-continuous mode, crucible pressurization must increase correspondingly with the decrease in the level of the batch as extrusion proceeds. Thus, in the batch mode, the compensating fluid is an inert gas. If the process is operating in the continuous mode, a replenishing flow of molten alloy must be provided to the crucible as extrusion proceeds. Thus, in the continuous mode, the compensating fluid is molten alloy. As a hybrid alternative in the continuous mode, the controller may concurrently control crucible pressurization and the molten alloy replenishing flow. This alternative is discussed below in connection with FIG. 3.

If a conventional static-tube with immersible diaphragm were used in such a high temperature environment, the diaphragm would likely be destroyed, or, at the least, the molten alloy would likely be contaminated by diaphragm materials being solubilized in the melt. Alternatively, if the open-ended tube were used as a conventional bubbler-tube, bubbles entrained in the extrusion flow would disturb the uniformity of the cast filament. Thus, the present invention provides a static-tube configuration that is suitable for immersion in high temperature liquids. A requirement, of course, is that the tube material must withstand the high temperature environment. A tube composed of fused silica is compatible with a wide range of molten alloys.

Figures 2A, 2B:
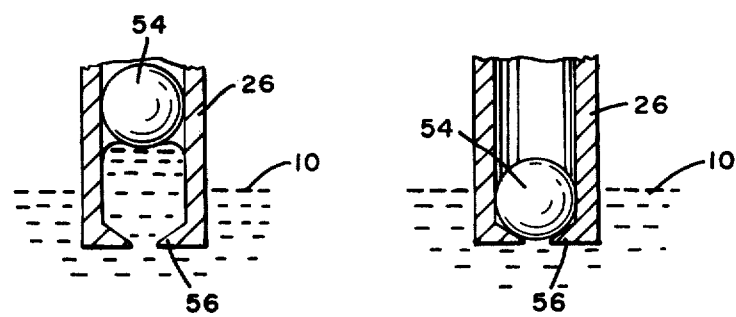
FIGS. 2A and 2B show an optional check-valve at the immersible end of the pressure tube of the invention in the open and closed position, respectively.

In FIGS. 2A and 2B, an optional check-valve is shown at the immersible opening of the static-tube, in the open and closed position respectively, and may be included for the purpose of preventing loss of the static-tube gas should the liquid level drop below the tube opening. However, the inclusion of a check-valve does not change the principle of operation of the invention. The check-valve includes a valve float 54 and a supporting closure rim 56 at the immersible opening of the tube 26. The valve float 54 may for example be a thin-walled hollow sphere of fused silica having a diameter slightly less than the inside diameter of the static-tube 26.

To initialize the tube 26 at a reference pressure for the configuration shown, the isolation valve 34 is closed, and the lower opening of the tube is immersed in the molten alloy 10 to a depth that includes the lower limit of the level control range of interest. The static-tube pressure 40 is then adjusted as equal to, greater than, or less than the gas pressure 41 within the crucible 12. The liquid level 38 in the tube 26 will then be equal to, less than, or greater than the crucible liquid level 36, respectively. The extent of pressurization of the static-tube relative to the crucible pressure and tube immersion depth are not critical so long as some reference is established. However, the reference liquid level in the static-tube should be such that the tube liquid level 38 in fact remains in the tube 26 over the control range anticipated for the crucible liquid level 36.

The inside diameter of the static-tube 26 should be selected in a range delimited according to certain practical considerations. The tube diameter must be large enough to avoid the capillary rise effect for the particular liquid, depending on its surface tension properties. On the other hand, the tube inside diameter should be small enough in relation to the tube length such that a change in liquid volume in the tube does not produce a significant change in the liquid volume in the reservoir. Restated, for the maximum tube pressure change anticipated during an operation, the corresponding tube liquid volume change should be less than an acceptable measurement error for liquid volume in the reservoir.

The sensitivity of the device to changes in reservoir head may be selected according to the initial pressure of the static-tube, as may be seen from the following equations:

$$(\Delta p/p_o) = K(\Delta H/H_o) \tag{1}$$

and $$K = \rho g H_o/p_o \tag{2}$$
$$= (\rho g H_o/P_o)/(p_o/P_o) > 1$$

where
K = sensitivity constant,
p = static-tube pressure,
$p_o$ = initial or reference static-tube pressure,
$P_o$ = initial reservoir pressurization,
H = reservoir head,
$H_o$ = initial or reference reservoir head,
$\rho$ = density of liquid,
g = gravitational constant.

Thus, a given relative change in reservoir liquid level will be amplified in the corresponding tube pressure relative change, depending on the extent that K exceeds 1. For example, given a pressurized reservoir having 2 atmospheres overpressure, a liquid having a density of 8 gm/cc, and an initial liquid level of 130 cm, the initial nozzle head ($H_o$) will be about 3 atmospheres. If a three-to-one variation of the tube pressure for a given variation in reservoir head is required, then initial tube pressure ($p_o$) is selected as about 1 atmosphere to yield a sensitivity constant (K) of 3.

The primary variables influencing response quickness of the device to changes in reservoir head may be understood from the following equations:

$$(\Delta V/V_o) = -(\Delta p/p_o)/(1+(\Delta p/p_o)) \quad (3)$$

and $$(\Delta V) = V_o(\Delta V/V_o) = AL_o(\Delta V/V_o) \quad (4)$$

where
V = static-tube gas volume,
$V_o$ = initial or reference tube-gas volume,
A = cross-sectional area of tube opening,
$L_o$ = length of tube-gas at reference.

Thus, a relative change in head ($\Delta H/H_o$) produces a corresponding relative change in tube pressure ($\Delta p/p_o$, equation 1) by a corresponding relative change in tube-gas volume ($\Delta V/V_o$, equation 3). The smaller the volume change ($\Delta V$, equation 4), the smaller the liquid movement in the tube, and therefore the greater the acceleration of the meniscus in the tube. Since the tube-gas length ($L_o$, equation 4) is predetermined from the reference tube pressure ($p_o$, equation 2), it is seen from equation 4 that it is desirable to minimize tube area (A) to promote rapid response.

Regarding tube geometry, it is preferred that the cross-section of the tube be circular and constant along its length. However, the invention applies also for tubes of irregular cross-section, variable or not along the length of the tube.

In some applications, it may be necessary to provide temperature compensation for the static-tube gas pressure depending on the thermal inertia of the device relative to the magnitude of temperature variations with time in the overall system from a reference temperature. The object of such compensation would be to prevent any significant variation of the sensor gas temperature from reference conditions. If needed, temperature compensation could be provided, for example, by a thermostatically controlled heating element associated with the static-tube. In any event, before establishing a reference pressure in the static-tube for continuous operations, an initial holding period in most cases is preferred to allow thermal equilibration.

The differential pressure transducer 42, flow controller 46, and servo-valve 48 as previously stated may be any of a wide range of conventional units, mechanical or electrical. In the configuration where the control fluid 50 is a gas, an especially appropriate and economical device that combines these functions (dashed circumscription 58) is commercially available from Johnson Controls, Inc. of Milwaukee, Wisconsin, and is designated Model R-317 "gas flow controller". The device essentially operates by a diaphragm, sensitive to differential pressure variations, actuating a corresponding action at the appropriate control port for feed or bleed.

Figure 3:
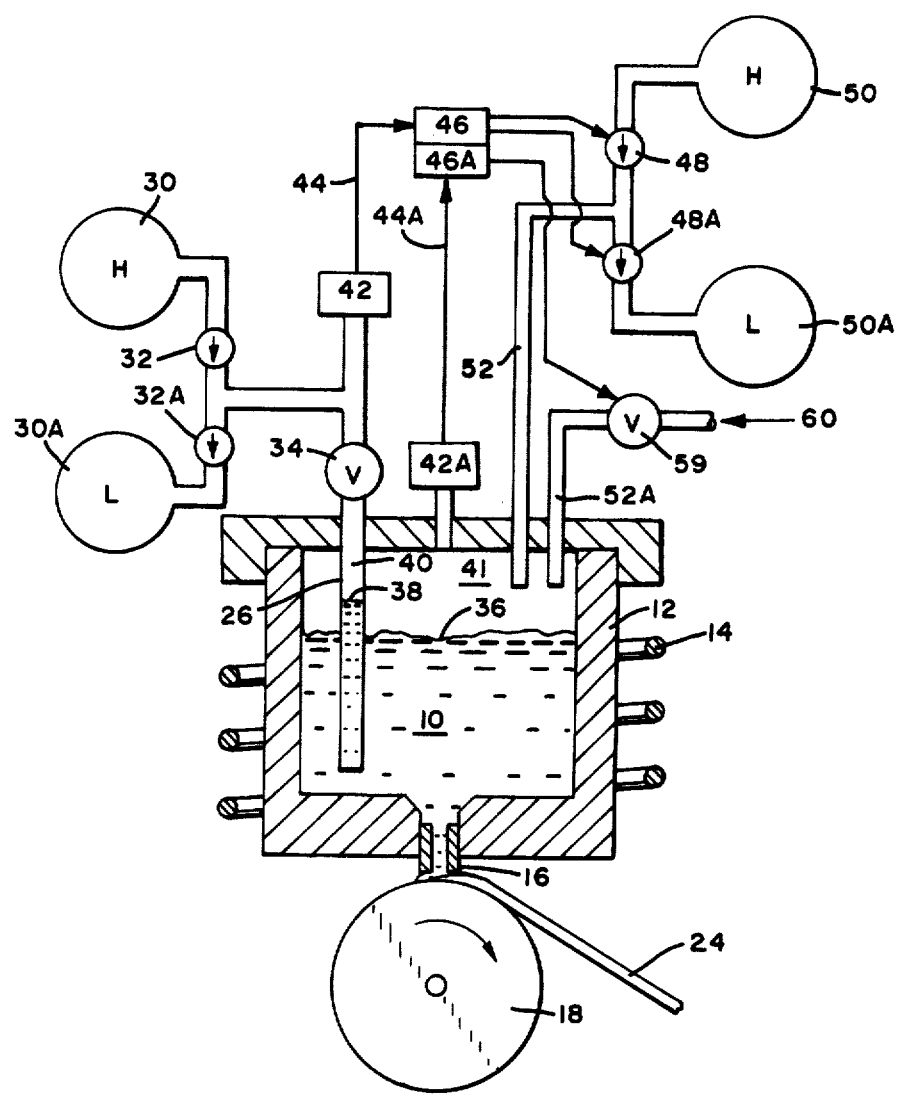
FIG. 3 shows schematically an alternative application of the invention, which is especially suited for high response continuous casting.

In FIG. 3, another operating configuration is shown, being especially suited for high response continuous operation. Reference numerals from FIG. 1 are repeated for respective components common to the two configurations. The function and cooperation of the components may be readily understood by considering the sequential stages of operation as described below: first, startup from hot standby; second, a control cycle during steady-state operation; and third, shutdown to hot standby.

Initially at the hot standby condition crucible pressure 41 is maintained at subatmospheric so that the high surface tension molten alloy 10 is prevented from flowing through nozzle 16. Pressure within tube 26 is reduced correspondingly to prevent bubbling by outflowing tube gas 40 through valve 32A to a low pressure reservoir 30A. To start extrusion of molten alloy 10 through nozzle 16 onto the rotating chill roll 18, crucible pressure 41 is increased sufficiently to achieve the desired extrusion rate by flowing inert gas from high pressure reservoir 50 through servo-valve 48 and conduit 52. Servo-valves 32, 32A, 48, and 48A are nominally closed but when actuated allow gas flow in the direction indicated. Concurrent with crucible pressurization, sensor tube 26 is pressurized to reference pressure by flowing inert gas from high pressure reservoir 30 through valve 32.

As extrusion begins, liquid level 36 begins to drop producing a corresponding sensor signal 44 resulting from a drop in tube level 38. Controller 46 increases crucible pressure 41, by flowing gas from high pressure reservoir 50, in an amount necessary to restore tube pressure to reference and thereby to maintain a substantially constant pressure head at the inlet of nozzle 16 and a substantially constant extrusion rate.

This compensating process continues with the crucible pressure 41 increasing and the molten alloy level 36 decreasing. As the level 36 approaches the lower opening of tube 26 and, correspondingly, as the crucible pressure 41 approaches a high limit as sensed by pressure transducer 42A, controller 46A causes servo-valve 59 to open thereby providing a replenishing flow of molten alloy 60 through conduit 52A. During replenishment, molten alloy level 36 rises, and pressure of the tube gas 40 increases correspondingly. Controller 46 reduces crucible pressure 41, to continue to maintain a constant extrusion head at nozzle 16, by outflowing crucible gas to low pressure reservoir 50A through conduit 52 and servo-valve 48A. When transducer 42A indicates that crucible pressure 41 has reached a low limit, controller 46A closes servo-valve 59 thereby discontinuing replenishing flow 60. This control cycle is repeated indefinitely. Control functions 46 and 46A are preferably accomplished by a single microcomputer.

To stop extrusion, crucible pressure 41 is reduced to subatmospheric by outflowing crucible gas to low pressure reservoir 50A. Concurrently, sensor tube pressure is reduced correspondingly to prevent bubbling by outflowing tube gas 40 through valve 32A to low pressure reservoir 30A. It is noted that this last step is unnecessary if sensor tube 26 has a checkvalve as described above in connection with FIG. 2.

Although the present invention has been described in conjunction with particular apparatus, it is to be understood that modifications and variations may be practiced without departing from the principles of the invention, as those skilled in the art will readily understand. Accordingly, such modifications and variations may be practiced within the scope of the following claims:

What is claimed is:

1. A method for monitoring the level of a liquid in a reservoir utilizing apparatus that includes an open-ended tube having one end in pneumatic communication with a differential pressure transducer, comprising:
   (a) immersing the open end of said tube in said liquid;
   (b) adjusting a reference quantity of inert gas within said tube after immersion of said open end and then isolating said gas within said tube to produce a static-tube configuration thereof; and (c) determining the level of said liquid by comparing the output of said transducer with a reference value, as said output varies with variations in said level.

2. A method, as in claim 1, wherein step (b) further comprises selecting said reference quantity of gas corresponding to a selected reference tube pressure further corresponding to a selected sensitivity in monitoring said liquid level.

3. A method, as in claim 2, further comprising:
(d) compensating for changes in said level from a reference value in response to the output of said transducer.

4. A method, as in claim 3, wherein step (d) further comprises maintaining the total head at a reference elevation in said liquid within a selected range, while said liquid is being withdrawn from said reservoir, by providing a compensating inert gas flow to pressurize said reservoir in response to the output of said transducer.

5. A method, as in claim 4, further comprising maintaining said level within a selected range by providing a compensating liquid flow to said reservoir in response to the reservoir gas pressure.

6. Apparatus for monitoring the level of a liquid in a reservoir, comprising:
(a) a differential pressure transducer;
(b) a tube having a first open end adapted for direct immersion in said liquid and a second end in pneumatic communication with said transducer; and
(c) means for adjusting a reference quantity of gas within said tube after immersion of its first end in said liquid and then isolating said gas within said tube to produce a static-tube configuration thereof, said quantity of gas corresponding to a selected reference tube pressure further corresponding to a selected monitoring sensitivity.

7. Apparatus, as in claim 6, further comprising:
(d) control means for compensating a change in the level of said liquid in response to the output of said transducer.

8. Apparatus, as in claim 7, wherein said control means actuates a compensating inert gas flow to pressurize said reservoir such that the total head at a reference elevation in said liquid is maintained within a selected range, while said liquid is being withdrawn from said reservoir.

9. Apparatus, as in claim 8, wherein said control means actuates a compensating liquid flow to said reservoir such that said level is maintained within a selected range.

10. Apparatus, as in claim 6, wherein said tube further comprises a check-valve at its immersible opening.

11. Apparatus, as in claim 6, further comprising temperature compensating means for maintaining the reference gas temperature substantially constant.

12. Apparatus, as in claim 6, wherein said tube is composed of fused silica.

* * * * *